No. 794,395.  
PATENTED JULY 11, 1905.  
F. CONRAD.  
ELECTRICAL MEASURING INSTRUMENT.  
APPLICATION FILED JAN. 20, 1904.

2 SHEETS—SHEET 1.

WITNESSES:  
C. L. Belcher  
F. H. Miller

INVENTOR  
Frank Conrad  
BY  
Wesley G. Carr  
ATTORNEY

No. 794,395. PATENTED JULY 11, 1905.
F. CONRAD.
ELECTRICAL MEASURING INSTRUMENT.
APPLICATION FILED JAN. 20, 1904.

2 SHEETS—SHEET 2.

WITNESSES:
C. L. Belcher
F. H. Miller.

INVENTOR
Frank Conrad
BY
Wesley G. Sloan
ATTORNEY

No. 794,395. Patented July 11, 1905.

UNITED STATES PATENT OFFICE.

FRANK CONRAD, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

SPECIFICATION forming part of Letters Patent No. 794,395, dated July 11, 1905.

Application filed January 20, 1904. Serial No. 189,909.

*To all whom it may concern:*

Be it known that I, FRANK CONRAD, a citizen of the United States, and a resident of Edgewood Park, in the county of Allegheny and State of Pennsylvania, have invented a new and useful Improvement in Electrical Measuring Instruments, of which the following is a specification.

My invention relates to alternating-current electrical measuring instruments, and though it relates particularly to that class of instruments which indicate the current or voltage of a circuit at a given instant it may also be adapted for embodiment in recording or registering instruments.

The object of my invention is to provide an instrument of the character indicated which shall at all times accurately indicate the current or voltage of an alternating-current circuit irrespective of the wave form of the current or of its frequency of alternations and which shall be inherently "dead-beat."

Another object of my invention is to provide an instrument which is simple, compact, and inexpensive in construction.

Figure 1:
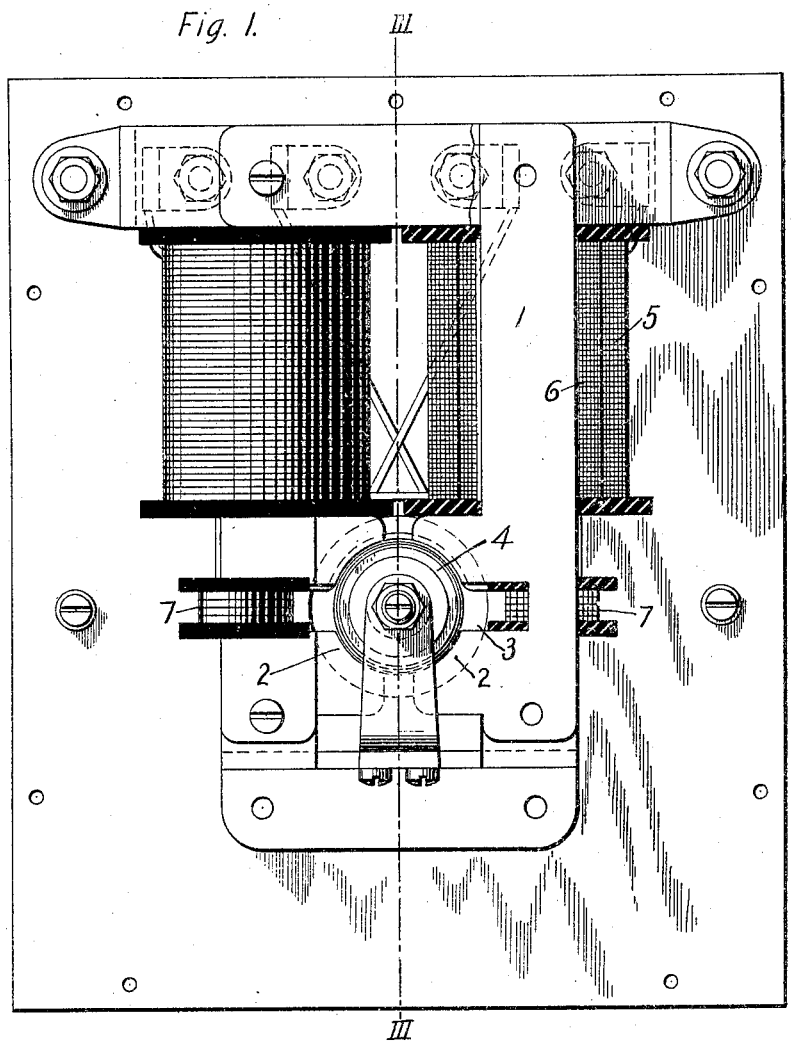
Figure 2:
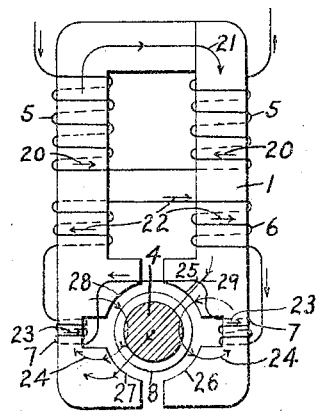
Figure 3:
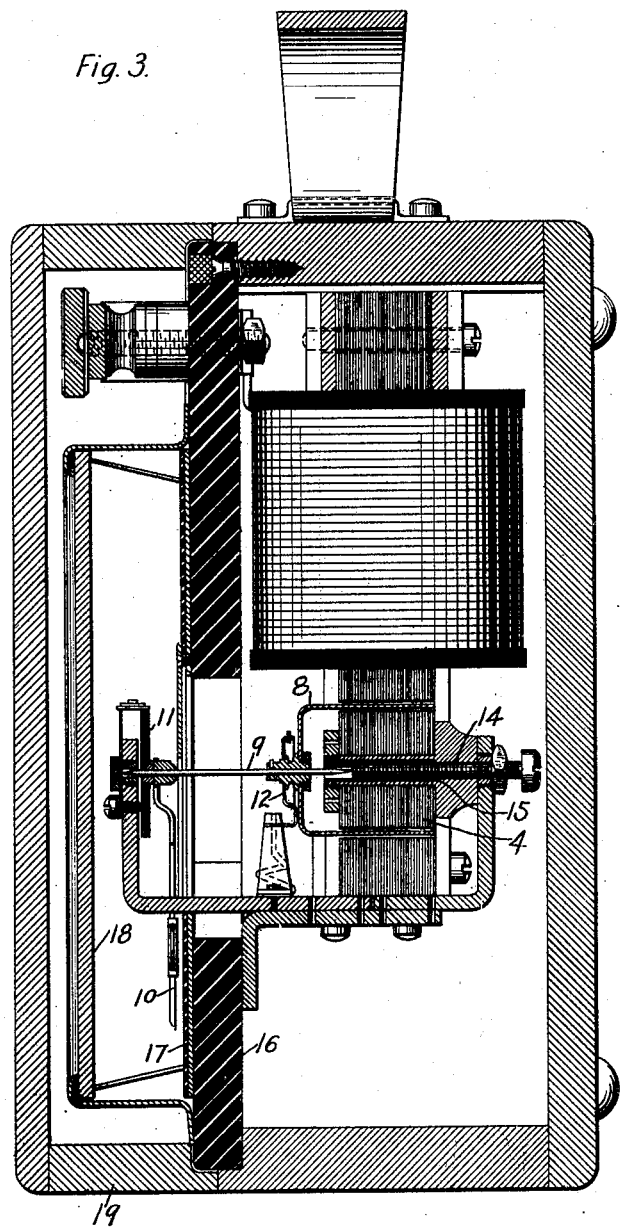

In the accompanying drawings, Figure 1 is a bottom plan view of a portable instrument constructed in accordance with my invention, one pair of the coils being shown in section. Fig. 2 is a diagrammatic view of the connections and arrangements of the various circuits of the instrument; and Fig. 3 is a sectional view on line III III of Fig. 1, also showing an inclosing case and a dial for the instrument.

The horseshoe-shaped iron core 1 of the instrument is provided with concave-faced pole-pieces 2, having recesses 3, a cylindrical core portion 4 being placed within the space between concave faces in order to decrease the reluctance of the magnetic circuit. The electromagnetical portions of the instrument constitute practically a series transformer in which the outer coils 5, that are here shown as connected in series with the external circuit, form the primary winding and the inner coils 6 the secondary winding. The secondary winding is connected in series with auxiliary coils 7, which surround portions of the pole-pieces that are reduced in cross-section by recesses 3, formed in the inner faces of the pole-pieces.

A hollow cylinder 8, which may be of the same material as the coils 7, surrounds the cylindrical portion 4 of the iron core and is supported by a shaft 9, which is provided with a pointer 10 and with suitable retarding means, such as a spring 11. The shaft 9 may also be provided with an arm 12, which engages with a stop 13 to limit the movement of the rotating member. One of the jeweled bearings for the shaft is secured in the end of a screw 14, which projects into an opening 15 in the cylindrical portion 4 of the iron core.

The instrument may be mounted upon the back of a slab 16, of marble or other suitable insulating material, which is provided with a graduated dial 17 and with a raised protecting crystal or cover 18, the whole being inclosed in a case 19, substantially as shown, for portable use.

The action of the instrument may be understood from a consideration of the diagram of Fig. 2. When the current in the coils 5 is in the direction indicated by the arrows 20, the magnetic flux produced by it in the core is in the direction indicated by the arrow 21, and the current induced in the coils 6 is in the direction indicated by the arrows 22. The arrows 23 indicate the directions of the currents in the coils 7 and the arrows 24 the directions of the fluxes produced by these currents. The resultant of the main flux produced by the coils 5 and that produced by the coils 7 is a diagonal flux from the pole-face 25 to pole-face 27, as indicated by the arrows 29. During a succeeding instant the flux will assume a direction from the pole-face 26 to pole-face 28 and will make one rotation during a complete period of alternation of the current. Currents are induced in the cylinder 8, and the rotary field exerts a dragging force upon these currents, causing the cylinder to rotate or exerting a torque upon said cylinder.

In order to obtain an instrument which will indicate accurately regardless of the frequency of alternations, the pull on the movable member must be constant for a current corresponding to a given deflection. The pull on the movable member or the torque tending to produce rotation thereof is proportional to the product of the magnetic field, the ampere-turns of the coils 7, and the frequency of alternations. In a series transformer the main flux in the core is inversely proportional to the frequency with a constant secondary load, and the component of the primary current which produces this magnetization is in the case of non-inductive load on the secondary approximately ninety degrees behind the main primary current. In my instrument the load on the secondary consists practically of the ohmic resistance of the secondary coils 6 and that of the auxiliary coils 7, and therefore the conditions above described will obtain. Since the pull or torque on the rotatable member 8 is proportional to the product of the magnetic flux, frequency and current in the coils 7, the force exerted with any given current remains constant for any frequency, because a change of frequency will vary the main flux in the inverse ratio and the current in the coils 7 is practically the same at all frequencies for a given current in the coils 5, and hence the product of the three quantities remains constant. Any variation in the magnetizing component of the primary current will have but slight effect on the resultant secondary current, as this component is at right angles to the component of the main current and also of much smaller value because of low magnetic reluctance and low voltage per turn.

My instrument is practically independent of temperature, since the coils 7 are ordinarily of the same conducting material as the cylinder 8, and therefore the resistances of the two increase at the same rate with rise of temperature. If the temperature rises, the greater resistance of the coils 7 will require a higher voltage impressed on them to cause the same current to flow that previously flowed and hence a higher magnetization in the core, which will compensate for higher resistance in the movable member 8.

Since the cylindrical shell or movable member 8 rotates in a magnetic field, the instrument is inherently dead-beat, according to principles well understood in the art.

Variation of wave form affects only the iron losses of electrical apparatus, and since these losses are very small in my instrument it is practically independent of wave form.

I claim as my invention—

1. An alternating-current electrical measuring instrument comprising primary and secondary field-coils, a bipolar core therefor, a rotatable conducting member between the pole-pieces of said core, and auxiliary coils on said pole-pieces that are connected in series with the secondary coils.

2. In an alternating-current electrical measuring instrument, the combination with a bipolar core and a conducting member rotatably mounted between the pole-pieces of said core, of primary and secondary field-coils on said core, and auxiliary coils on the pole-pieces that are connected in series with the secondary coils for producing magnetic fluxes which oppose and displace the primary flux.

3. In an alternating-current electrical measuring instrument, the combination with a bipolar core, primary and secondary field-coils, and auxiliary coils connected in series with the secondary coils and mounted in axial alinement therewith, of a rotatable, conducting member located between the pole-pieces of said core.

4. In an alternating-current electrical measuring instrument, the combination with a bipolar core and a rotatable conducting member between the pole-pieces thereof, of a pair of magnetizing-coils, a pair of secondary coils and a pair of auxiliary coils, said auxiliary coils being connected in series with said secondary coils and so disposed on said pole-pieces as to produce a rotating field.

5. In an alternating-current electrical measuring instrument, the combination with a core and a rotatable conducting member between the pole-pieces thereof, of magnetizing-coils and secondary coils that surround said core, and auxiliary coils that are connected in series with said secondary coils and also surround said core but are located nearer to said rotatable member and are so disposed as to produce a rotating field to act upon the rotatable cylinder.

6. An alternating-current electrical measuring instrument having a core, a rotatable conducting member between the pole-pieces of said core, coils for magnetizing said core, and means for producing a rotating field comprising secondary coils and auxiliary coils connected in series therewith and located in recesses in the pole-pieces.

7. In an alternating-current electrical measuring instrument, means for producing rotation of the movable member comprising a bipolar core, primary and secondary coils that surround said core and auxiliary coils that surround the pole-pieces of said core adjacent to the movable member and are connected in series with the secondary coils.

8. An alternating-current measuring instrument comprising a magnetizable core, primary and secondary field-coils that surround said core, auxiliary coils that surround the core pole-pieces and are connected in series with the secondary coils, a conducting member rotatably mounted between said pole-pieces and means for indicating the degree or amount of movement of said rotatable member.

9. An alternating-current measuring instrument comprising a magnetizable core, primary and secondary field-coils that surround said core, auxiliary coils that surround the core pole-pieces and are connected in series with the secondary field-coils, a conducting member rotatably mounted between said pole-pieces, means for indicating the degree or amount of movement of said rotatable member and means for retarding or restraining the movement of said member.

10. The combination with a magnetizable core and a rotatable, conducting member, of a primary exciting-winding, a secondary winding and an auxiliary winding that is connected in series with the secondary winding and that surrounds portions of the pole-pieces of the core.

11. The combination with a bipolar magnetizable core and a rotatable conducting member, of a primary magnetizing-winding, a secondary winding, and an auxiliary winding that surrounds portions of the pole-pieces of the core.

12. The combination with a bipolar magnetizable core and a rotatable conducting member, of a primary magnetizing-winding, a secondary winding and an auxiliary winding that is connected in circuit with the secondary winding and that surrounds portions of the pole-pieces of the core.

In testimony whereof I have hereunto subscribed my name this 11th day of January, 1904.

FRANK CONRAD.

Witnesses:
   Jos. W. Alexander,
   Birney Hines.